(12) United States Patent
Vikor et al.

(10) Patent No.: US 10,845,512 B2
(45) Date of Patent: Nov. 24, 2020

(54) COATED ARTICLE FOR USE IN SURVEILLANCE WINDOW OR THE LIKE AND METHOD OF MAKING SAME

(71) Applicants: Guardian Europe S.A.R.L., Bertrange (LU); GUARDIAN GLASS, LLC, Auburn Hills, MI (US)

(72) Inventors: Gyorgy Vikor, Oroshaza (HU); Jian-gang Weng, Canton, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 20 days.

(21) Appl. No.: 15/389,510

(22) Filed: Dec. 23, 2016

(65) Prior Publication Data

US 2018/0180776 A1  Jun. 28, 2018

(51) Int. Cl.
*G02B 5/08* (2006.01)
*C03C 17/36* (2006.01)

(52) U.S. Cl.
CPC ........ *G02B 5/0808* (2013.01); *C03C 17/3618* (2013.01); *C03C 17/3626* (2013.01); *C03C 17/3639* (2013.01); *C03C 17/3644* (2013.01); *C03C 17/3649* (2013.01); *C03C 17/3663* (2013.01)

(58) Field of Classification Search
CPC .... G02B 5/0808; G02B 19/0042; G02B 5/08; G02B 5/085; G02B 1/10; G02B 5/0816; G02B 5/0858; G02B 5/0875; G02B 27/142; G02B 5/3041

USPC ........................................ 359/839, 883, 884
See application file for complete search history.

(56) References Cited

U.S. PATENT DOCUMENTS

| 5,858,519 | A | 1/1999 | Klinger et al. |
| 5,965,246 | A | 10/1999 | Guiselin et al. |
| 8,663,433 | B2 | 3/2014 | Chonlamaitri et al. |
| 8,702,253 | B2 | 4/2014 | Lu et al. |
| 8,945,714 | B2 | 2/2015 | Lao et al. |
| 9,134,467 | B2 | 9/2015 | Krasnov et al. |
| 9,221,713 | B2 | 12/2015 | Lage et al. |
| 9,328,017 | B2 | 5/2016 | Dietrich et al. |
| 9,340,452 | B2 | 5/2016 | O'Connor et al. |

(Continued)

FOREIGN PATENT DOCUMENTS

| EA | 016220 B1 | 3/2012 |
| RU | 2432329 C2 | 10/2011 |

(Continued)

*Primary Examiner* — Jade R Chwasz

(57) ABSTRACT

A coated article is provided for use in a surveillance window or the like. The coated article is a second surface one-way mirror that allows an observer(s) on an observer side to be able to see an object(s)/subject(s) on the opposite side of the coated article, but a viewer on the opposite side cannot reasonably see through the coated article to view things on the observer side of the coated article. The second surface mirror is designed to have a high glass side visible reflectance ($R_GY$), and an extremely low film side visible reflectance ($R_FY$), so that visible transmission ($T_{vis}$ or TY) of the coated article is lower than the glass side visible reflectance but higher than the film side visible reflectance.

30 Claims, 3 Drawing Sheets

(56) References Cited

U.S. PATENT DOCUMENTS

| | | |
|---|---|---|
| 9,341,748 B2 | 5/2016 | Krasnov et al. |
| 9,371,684 B2 | 6/2016 | Butz et al. |
| 9,403,717 B2 | 8/2016 | Knoll et al. |
| 9,422,626 B2 | 8/2016 | Wuillaume et al. |
| 9,869,016 B2* | 1/2018 | Imran ............... C23C 14/35 |
| 2003/0095331 A1 | 5/2003 | Bengoechea et al. |
| 2006/0246301 A1* | 11/2006 | Stachowiak ............ C03C 17/36 |
| | | 428/432 |
| 2007/0052805 A1 | 3/2007 | Inagaki et al. |
| 2007/0159695 A1 | 7/2007 | Bengoechea et al. |
| 2009/0104385 A1 | 4/2009 | Reymond et al. |
| 2010/0232029 A1* | 9/2010 | Lewis, Jr. ........... A01M 31/025 |
| | | 359/629 |
| 2014/0226208 A1 | 8/2014 | Vikor |
| 2014/0227500 A1 | 8/2014 | Vikor |
| 2015/0191815 A1* | 7/2015 | Ding .................... C23C 14/08 |
| | | 427/164 |

FOREIGN PATENT DOCUMENTS

| | | |
|---|---|---|
| WO | 2007064450 A2 | 6/2007 |
| WO | 2018066293 A1 | 4/2018 |

\* cited by examiner

COATED ARTICLE FOR USE IN SURVEILLANCE WINDOW OR THE LIKE AND METHOD OF MAKING SAME

This application relates to a coated article for use in a surveillance window or the like, and a method of making same. The coated article is a second surface one-way mirror that allows an observer(s) on an observer side to be able to see an object(s)/subject(s) on the opposite side of the coated article, but a viewer on the opposite side cannot reasonably see through the coated article to view things on the observer side of the coated article. The second surface mirror is designed to have a high glass side visible reflectance ($R_GY$), and an extremely low film side visible reflectance ($R_FY$), so that visible transmission ($T_{vis}$ or TY) of the coated article is lower than the glass side visible reflectance but higher than the film side visible reflectance. The coated article includes a coating on a glass substrate, where the coating includes at least one reflective layer (e.g., NiCr, Al, and/or Ag) sandwiched between at least transparent dielectric layers.

BACKGROUND AND SUMMARY OF EXAMPLE EMBODIMENTS OF THE INVENTION

For purposes of surveillance or reconnaissance, coated articles have been provided for allowing an observer to be able to see an object/subject through the coated article, without the object/subject being able to see the observer.

An example product on the market is known as Mirrorpane™. Mirrorpane™ is a first surface mirror, so that the coating is on the side of the glass substrate opposite the observer. In other words, the coating in Mirrorpane™ is located on the side of the glass substrate closest to the object/subject to be viewed. Mirrorpane™ has a low glass side visible reflectance ($R_GY$) of 16%, a high film side visible reflectance ($R_FY$) of 68%, and a visible transmission ($T_{vis}$ or TY) of 11%. Thus, Mirrorpane™ is disadvantageous and problematic for the following reasons. First, the mirror coating is on the subject/object side of the glass substrate. In order to achieve surveillance, Mirrorpane™ utilizes high visible reflectance of 68% as viewed from the film side of the coated article. Generally speaking, the group that is under observation (subject/object side) is more likely to touch the mirror than those who are observing that group (observer side). Thus, the coating in Mirrorpane™ will experience undesirable abrasion from touches on the subject/object side since the coating is on that side, and is susceptible to failure. Such coated articles having high visible reflectance on the film side are thus undesirable, and such coated articles where the reflective coating is on the subject/object side of the glass substrate are undesirable. Second, the optics of Mirrorpane™ are less than desirable. In particular, the low reflecting side of Mirrorpane™ has a visible reflectance of 16% which is undesirably higher than the 11% visible transmission of the product. Thus, it can be difficult under certain conditions for an observer to sufficiently see the subject/object, because the visible reflectance from the observer side is higher than the visible transmission of the coated article.

In certain example embodiments of this invention, the aforesaid problems are solved in the context of a surveillance window.

In example embodiments of this invention, there is provided a coated article for use in a surveillance window or the like, and a method of making same. The coated article is a second surface one-way mirror that allows an observer(s) on an observer side to be able to see an object(s)/subject(s) on the opposite side of the coated article, but a viewer on the opposite side cannot reasonably see through the coated article to view things on the observer side of the coated article. The coating is provided on the observer side of the glass substrate so as to reduce touching of a reflective coating from the object/subject side of the coated article. The second surface mirror is designed to have a high glass side visible reflectance ($R_GY$), and an extremely low film side visible reflectance ($R_FY$), so that visible transmission ($T_{vis}$ or TY) of the coated article is lower than the glass side visible reflectance but higher than the film side visible reflectance. In certain example embodiments of this invention, the visible transmission ($T_{vis}$ or TY) of the coated article is lower than the glass side visible reflectance by at least about 40%, more preferably by at least about 50%, and most preferably by at least about 56%; and the visible transmission of the coated article is higher than the film side visible reflectance of the coated article by at least about 3%, more preferably by at least 5%, and most preferably by at least 8%.

An example embodiment of this invention provides a surveillance window comprising a coated article including a coating supported by a glass substrate, the coating comprising: a first high index dielectric layer having a refractive index of from about 1.8-2.4; a first low index dielectric layer having a refractive index of from about 1.2-1.7 on the glass substrate over at least the first high index dielectric layer; a reflective layer on the glass substrate over at least the first high index dielectric layer and the first low index dielectric layer; a second high index dielectric layer having a refractive index of from about 1.8-2.4 on the glass substrate over at least the reflective layer; wherein the coating is on an observer side of the glass substrate; and wherein the coated article of the surveillance window, measured monolithically, has a visible transmission ($T_{vis}$ or TY) that is lower than a glass side visible reflectance ($R_GY$) of the coated article and higher than a film side visible reflectance ($R_FY$) of the coated article, so that the surveillance window is configured (a) to allow an observer on the observer side to see through the surveillance window to see an object on the opposite side of the surveillance window, and (b) to not allow a viewer on the opposite side to reasonably see through the surveillance window to view things on the observer side.

In an example embodiment of this invention, there is provided a coated article including a coating supported by a glass substrate, the coating comprising: a first dielectric layer; a second dielectric layer on the glass substrate over at least the first dielectric layer; a reflective layer on the glass substrate over at least the first and second dielectric layers; a third dielectric layer on the glass substrate over at least the reflective layer; a fourth dielectric layer on the glass substrate over at least the third dielectric layer; and wherein the coated article, measured monolithically, has a visible transmission ($T_{vis}$ or TY) that is at least 40% lower than a glass side visible reflectance ($R_GY$) of the coated article and at least 3% higher than a film side visible reflectance ($R_FY$) of the coated article, so that the coated article is configured (a) to allow an observer on an observer side of the coated article to see through the coated article to see an object on an opposite side of the coated article, and (b) to not allow a viewer on the opposite side to reasonably see through the coated article to view things on the observer side.

In an example embodiment of this invention, there is provided a surveillance window comprising a coated article including a coating supported by a glass substrate, the coating comprising: a first dielectric layer having a refractive index of from about 1.8-2.5; a second dielectric layer having a refractive index of from about 1.2-1.7 on the glass substrate over at least the first dielectric layer; a third dielectric layer having a refractive index of from about 1.8-2.5 on the glass substrate over at least the first and second dielectric layers; a fourth dielectric layer having a refractive index of from about 1.2-1.7 on the glass substrate over at least the first, second, third and fourth dielectric layers; a reflective layer on the glass substrate over at least the first high index dielectric layer and the first low index dielectric layer; a fifth dielectric layer on the glass substrate over at least the reflective layer; and a sixth dielectric layer on the glass substrate over at least the reflective layer and the fifth dielectric layer; wherein the coating is on an observer side of the glass substrate; and wherein the coated article of the surveillance window, measured monolithically, has a visible transmission ($T_{vis}$ or TY) that is lower than a glass side visible reflectance ($R_G Y$) of the coated article and higher than a film side visible reflectance ($R_F Y$) of the coated article, so that the surveillance window is configured (a) to allow an observer on the observer side to see through the surveillance window to see an object on the opposite side of the surveillance window, and (b) to not allow a viewer on the opposite side to reasonably see through the surveillance window to view things on the observer side.

DETAILED DESCRIPTION OF EXAMPLE EMBODIMENTS OF THE INVENTION

Figure 1:
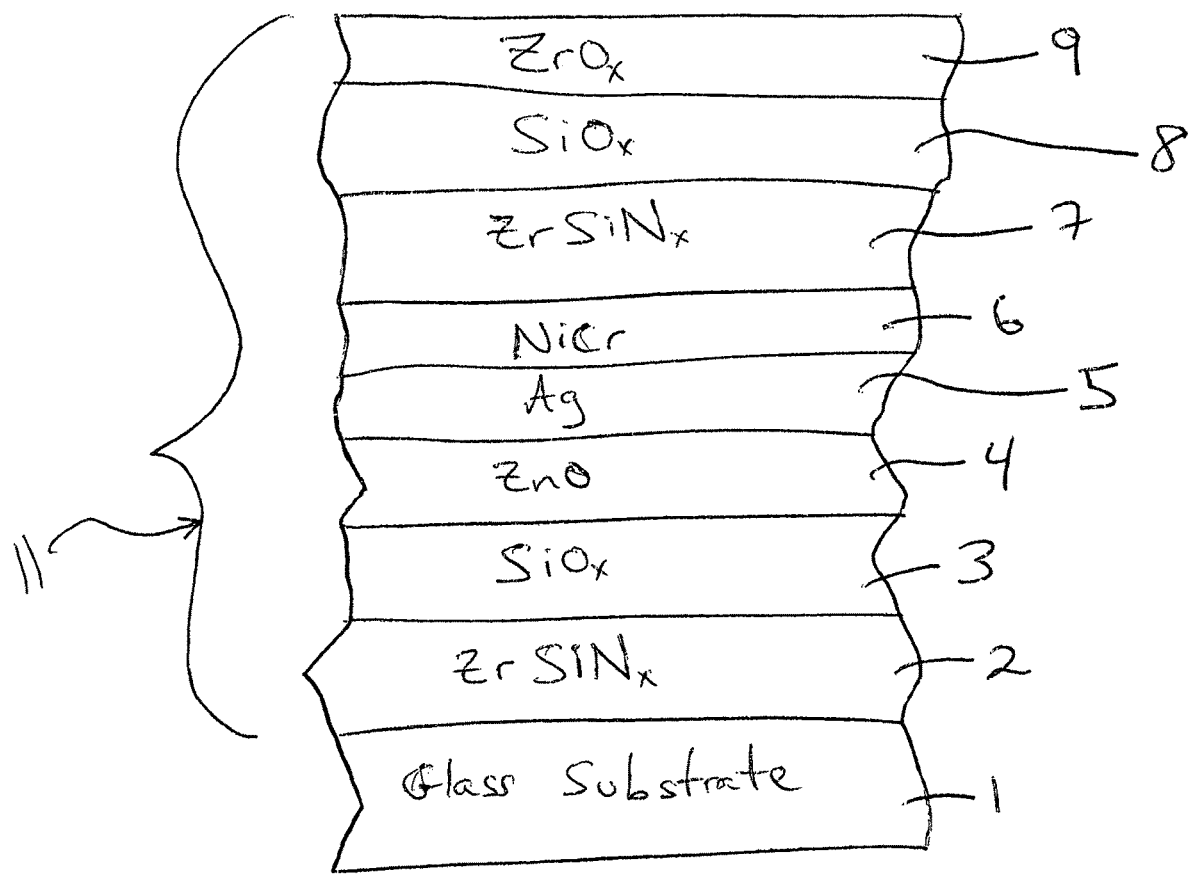
FIG. 1 is a cross sectional view of a surveillance window according to an example embodiment of this invention.

Referring now to the drawings in which like reference numerals indicate like parts throughout the several views.

In certain example embodiments of this invention, there is provided a coated article for use in a surveillance window or the like. The coated article is a second surface one-way mirror that allows an observer(s) on an observer side to be able to see an object(s)/subject(s) on the opposite side of the coated article, but a viewer on the opposite side cannot reasonably see through the coated article to view things on the observer side of the coated article. The coating 11 is provided on the observer side of the glass substrate 1 so as to reduce touching of a reflective coating 11 from the object/subject side of the coated article. The second surface mirror is designed to have a high glass side visible reflectance ($R_G Y$), and an extremely low film side visible reflectance ($R_F Y$), so that visible transmission ($T_{vis}$ or TY) of the coated article is lower than the glass side visible reflectance but higher than the film side visible reflectance. The coated article includes a coating 11 on a glass substrate 1, where the coating 11 includes at least one reflective layer (e.g., NiCr, Al, and/or Ag) 5, 6, 10 sandwiched between at least transparent dielectric layers 2, 3, 4, 7, 8, 9 of or including material such as silicon oxide (e.g., $SiO_2$) silicon nitride (e.g., $Si_3N_4$), silicon oxynitride, zirconium silicon nitride, zirconium silicon oxynitride, or the like. In certain example embodiments of this invention, the visible transmission ($T_{vis}$ or TY) of the coated article is lower than the glass side visible reflectance by at least about 40%, more preferably by at least about 50%, and most preferably by at least about 56%; and the visible transmission of the coated article is higher than the film side visible reflectance of the coated article by at least about 3%, more preferably by at least 5%, and most preferably by at least 8%. The observer, viewer, and subject/object may be people, but need not be people. For example, the observer or viewer may be a person, camera or other imaging device, and the object may be a person or any other viewable object that the observer is interested in seeing such as art work, furniture, food, electronics, or the like.

FIG. 1 is a cross sectional view of a coated article for use as a surveillance mirror or the like according to an example embodiment of this invention. The coated article includes glass substrate 1 (e.g., clear, green, bronze, or blue-green glass substrate from about 1.0 to 10.0 mm thick, more preferably from about 4.0 mm to 8.0 mm thick, with an example glass substrate thickness being about 6 mm), and a multi-layer one-way mirror coating (or layer system) 11 provided on the glass substrate 1 either directly or indirectly. Coating 11 is of or includes: transparent dielectric layer 2 of or including silicon nitride (e.g., $Si_3N_4$ or some other suitable stoichiometry), silicon oxynitride, zirconium silicon nitride ($ZrSiN_x$), zirconium silicon oxynitride, or the like; low index transparent dielectric layer 2 of or including a low refractive index material such as silicon oxide (e.g., $SiO_2$ or any other suitable stoichiometry for providing a refractive index "n" no greater than about 1.7); transparent dielectric lower contact layer 4 which may be zinc oxide based and may be of or include zinc oxide, zinc stannate, or the like and may optionally be doped with from about 1-8% aluminum; metal based layer 5 based on metal such as silver or gold; primary reflective layer 6 of or including NiCr, a nitride thereof, or other suitable material such as NbZr; transparent dielectric layer 7 of or including silicon nitride (e.g., $Si_3N_4$ or some other suitable stoichiometry), silicon oxynitride, zirconium silicon nitride ($ZrSiN_x$ where the x indicates that the layer may either be fully or partially nitrided), zirconium silicon oxynitride, or the like; low index transparent dielectric layer 8 of or including a low refractive index material such as silicon oxide (e.g., $SiO_2$ or any other suitable stoichiometry for providing a refractive index "n" no greater than about 1.7); and optional protective overcoat 9 of or including a material such as zirconium oxide (e.g., $ZrO_2$) or silicon oxynitride. Other layers and/or materials may also be provided in the coating in certain example embodiments of this invention, and it is also possible that certain layers may be removed or split in certain example instances. Moreover, one or more of the layers discussed above may be doped with other materials in certain example embodiments of this invention. In monolithic embodiments, the coated article includes only one glass substrate as shown in FIG. 1. However, monolithic coated articles herein may be used in other applications such as the coated article shown in FIG. 1 being laminated or otherwise coupled to another glass substrate (not shown) so that the coated article may be used in laminated window applications and IG window unit applications.

Thus, the surveillance mirror or spy mirror shown in FIG. 1 includes a metal based primary reflective layer 6 and a metal based secondary reflective layer 5 provided on zinc oxide based seed layer 4. Reflective layers 5 and 6 function together to reflective visible light and may be entirely or substantially metallic in certain example embodiments of this invention. Layers 5 and 6 are referred to as reflective layers in the FIG. 1 embodiment, even though the silver layer 5 alone may not be truly reflective of visible light if not combined with layer 6. While reflecting layers 5 and/or 6 may include some small amount of oxygen in certain instances, it is preferable that reflective layer(s) 5 and/or 6 (and layer 10 in the FIG. 2 embodiment, and including layer 6 in FIG. 3) are substantially free of oxygen such as no more than 8% oxygen, more preferably no more than about 5% oxygen, and most preferably no more than about 3% or 2% oxygen in certain embodiments (atomic %), and sometimes 0% or 1% oxygen. The layer stack made up of layers 4-6 is embedded in a dielectric layer stack having low 3, 8 and high 2, 7 refractive index (n, measured at 550 nm) layers. In certain example embodiments, it has been found that the NiCr/ZrSiN$_x$ feature provides for improved mechanical durability, while the optional ZrO$_x$ overcoat 9 feature provides for anti-fingerprint functionality and also increases mechanical durability of the coating if touched from the observer side. In certain example embodiments of this invention, the low index dielectric layers 3 and 8 have a refractive index (n) of from about 1.2-1.7, more preferably from about 1.3-1.65, and most preferably from about 1.4-1.6; and the high index dielectric layers 2 and 7 have a refractive index (n) of from about 1.8 to 2.5, more preferably from about 1.9-2.3, and most preferably from about 1.95-2.2, for antireflective properties especially from the film side of the coated article. The product provides for observation from the coating/film side of the glass substrate as shown in FIG. 1 under both regular and dark lighting conditions due to the very low film side reflection and appropriate transmission values of the coated article explained herein. The very low film side visible reflectance coupled with the transmission values of examples herein allow observation even in the case of relatively well illuminated areas on the observer side. The low visible transmission and high glass side visible reflectance values also prevent or reduce one on the object/subject side of the coated article from seeing the observer through the coated article, thereby providing for an ability to conduct surveillance or the like in example embodiments of this invention. The layers may be formed on the substrate 1 via sputter-deposition or any other suitable PVD type deposition process in example embodiments of this invention, and the glass substrate 1 may be clear float glass or other suitable type of glass in example embodiments of this invention. The coating 11 provides for non-symmetric reflection properties as explained herein that allows the product to be used for surveillance applications in certain example embodiments. The coated article may, or may not, be heat treated (e.g., thermally tempered) in different embodiments of this invention. In certain embodiments of this invention, the thicknesses and/or materials of the various layers may be designed so as to provide a* and/or b* color values (e.g., transmissive, film side reflective, and/or glass side reflective) to be fairly neutral and/or aesthetically desirable.

Other layer(s) below or above the illustrated coating 11 may also be provided, and optionally a protective coating (not shown) may be provided on the object/subject side of the glass substrate 1 in example embodiments of this invention. While a layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 2 and substrate 1. Moreover, certain layers of the illustrated coating 11 may be removed in certain embodiments, while others may be added between the various layers or the various layer(s) may be split with other layer(s) added between the split sections in other embodiments of this invention without departing from the overall spirit of certain embodiments of this invention.

While various materials and thicknesses may be used in different embodiments of this invention, example thicknesses and materials for the respective layers of coating 11 on the glass substrate 1 in the FIG. 1 embodiment are as follows, from the glass substrate outwardly. Thickness are in angstroms (Å).

TABLE 1

(Example Materials/Thicknesses; FIG. 1 Embodiment)

| Layer | Preferred Range (Å) | More Preferred (Å) | Example (Å) |
|---|---|---|---|
| ZrSiN$_x$ (layer 2) | 100-1000 Å | 250-700 Å | 350-520 Å |
| SiO$_x$ (layer 3) | 100-1100 Å | 400-1000 Å | 600-900 Å |
| ZnO (layer 4) | 20-250 Å | 30-90 Å | 40-55 Å |
| Ag (layer 5) | 40-200 Å | 60-140 Å | 80-120 Å |
| NiCr (layer 6) | 100-500 Å | 180-320 Å | 240-275 Å |
| ZrSiN$_x$ (layer 7) | 100-600 Å | 180-320 Å | 220-270 Å |
| SiO$_x$ (layer 8) | 100-700 Å | 200-500 Å | 300-400 Å |
| ZrO$_x$ (layer 9) | 20-200 Å | 30-100 Å | 40-75 Å |

Figure 2:
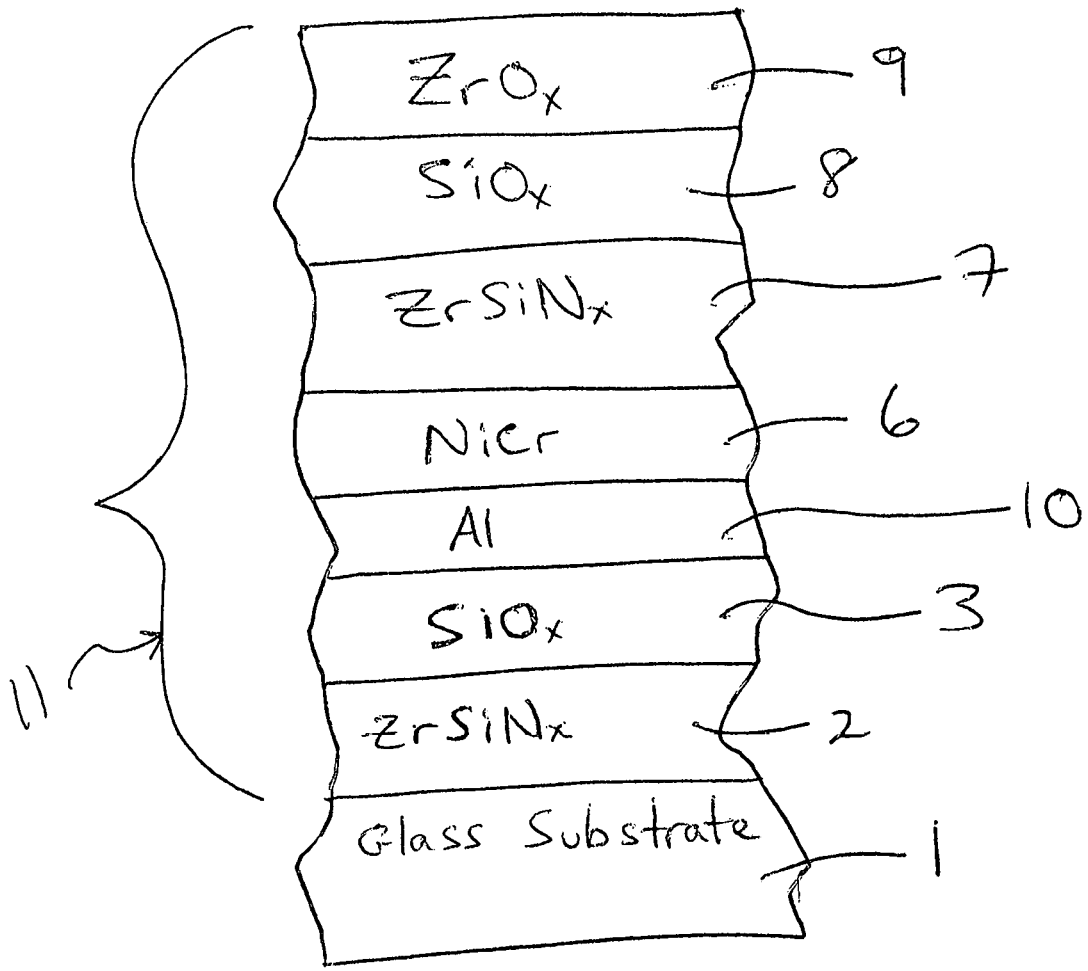
FIG. 2 is a cross sectional view of a surveillance window according to another example embodiment of this invention.

FIG. 2 is a cross sectional view of a coated article for use as a surveillance mirror or the like according to another example embodiment of this invention. The FIG. 2 coated article is the same as the coated article described above in connection with FIG. 1, except that the ZnO based layer 4 and Ag based layer 5 of the FIG. 1 embodiment are replaced with an aluminum based layer 10 in the FIG. 2 embodiment. Reflective layer 10 is of or includes Al in the FIG. 2 embodiment, with layers 6 and 10 being the reflective layers in the coating 11. It is noted that Al layer 10 may be nitrided in certain instances, and may optionally be doped with other material(s). Providing Al/NiCr (layers 10 and 6) in the FIG. 2 embodiment, instead of layers 4-6 of the FIG. 1 embodiment, advantageously allows the coated article to realize similar optical characteristics as well as a more robust coating 11 such as added chemical and mechanical durability and improved stability upon heat treatment or otherwise. Fine tuning of layer thicknesses is possible to adjust reflectance, transmittance, and coloration.

While various materials and thicknesses may be used in different embodiments of this invention, example thicknesses and materials for the respective layers of coating 11 on the glass substrate 1 in the FIG. 2 embodiment are as follows, from the glass substrate outwardly. Thickness are in angstroms (Å).

TABLE 2

(Example Materials/Thicknesses; FIG. 2 Embodiment)

| Layer | Preferred Range (Å) | More Preferred (Å) | Example (Å) |
|---|---|---|---|
| ZrSiN$_x$ (layer 2) | 100-1000 Å | 250-700 Å | 350-520 Å |
| SiO$_x$ (layer 3) | 100-1100 Å | 400-1000 Å | 600-900 Å |
| Al (layer 10) | 10-200 Å | 15-60 Å | 20-40 Å |
| NiCr (layer 6) | 100-500 Å | 180-320 Å | 240-275 Å |
| ZrSiN$_x$ (layer 7) | 100-600 Å | 180-320 Å | 220-270 Å |
| SiO$_x$ (layer 8) | 100-700 Å | 200-500 Å | 300-400 Å |
| ZrO$_x$ (layer 9) | 20-200 Å | 30-100 Å | 40-75 Å |

Figure 3:
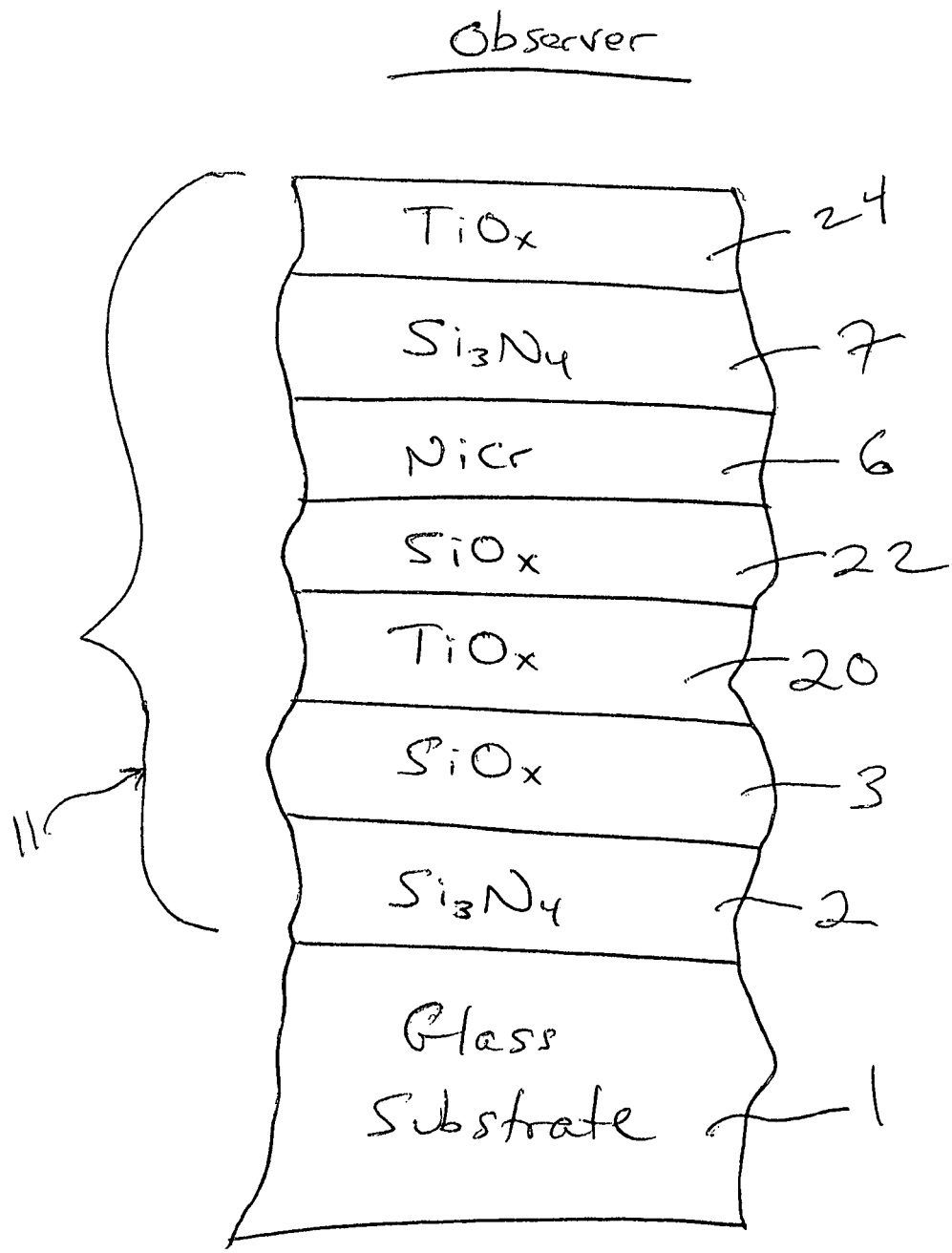
FIG. 3 is a cross sectional view of a surveillance window according to another example embodiment of this invention.

FIG. 3 is a cross sectional view of a coated article for use as a surveillance mirror or the like according to another example embodiment of this invention. Glass substrate 1 and reflective layer 6 are as discussed above regarding FIGS. 1-2. In FIG. 3, a multi-layer one-way mirror coating (or layer system) 11 is provided on the glass substrate 1 either directly or indirectly. Coating 11 is of or includes: transparent dielectric layer 2 of or including silicon nitride (e.g., $Si_3N_4$ or some other suitable stoichiometry), silicon oxynitride, titanium oxide, zirconium silicon nitride ($ZrSiN_x$), zirconium silicon oxynitride, or the like; low index transparent dielectric layer 2 of or including a low refractive index material such as silicon oxide (e.g., $SiO_2$ or any other suitable stoichiometry for providing a refractive index "n" no greater than about 1.7); high index dielectric layer 20 of or including a high index material such as titanium oxide (e.g., $TiO_x$ where x is preferably from 1.8 to 2, more preferably from 1.9 to 2) or silicon nitride or zirconium silicon nitride and having a refractive index of from 2.0 to 2.5, more preferably from 2.2 to 2.45, low index transparent dielectric layer 22 of or including a low refractive index material such as silicon oxide (e.g., $SiO_2$ or any other suitable stoichiometry for providing a refractive index "n" no greater than about 1.7); reflective layer 6 of or including NiCr, a nitride thereof, or other suitable material; transparent dielectric layer 7 of or including silicon nitride (e.g., $Si_3N_4$ or some other suitable stoichiometry), silicon oxynitride, zirconium silicon nitride ($ZrSiN_x$ where the x indicates that the layer may either be fully or partially nitrided), zirconium silicon oxynitride, or the like; and high index transparent dielectric overcoat 24 of or including a high index material such as titanium oxide (e.g., $TiO_x$ where x is preferably from 1.8 to 2, more preferably from 1.9 to 2) and having a refractive index of from 2.0 to 2.5, more preferably from 2.2 to 2.45. The high index and low index pairs between the reflective layer and the glass substrate are to enhance glass side visible reflection, whereas the layers above the reflective layer are to reduce film side visible reflection. Other layers and/or materials may also be provided in the coating in certain example embodiments of this invention, and it is also possible that certain layers may be removed or split in certain example instances. Moreover, one or more of the layers discussed above may be doped with other materials in certain example embodiments of this invention. In monolithic embodiments, the coated article includes only one glass substrate as shown in FIG. 3. However, monolithic coated articles herein may be used in other applications such as the coated article shown in FIG. 3 being laminated or otherwise coupled to another glass substrate (not shown) so that the coated article may be used in laminated window applications and IG window unit applications.

While various materials and thicknesses may be used in different embodiments of this invention, example thicknesses and materials for the respective layers of coating 11 on the glass substrate 1 in the FIG. 3 embodiment are as follows, from the glass substrate outwardly. Thickness are in angstroms (Å).

TABLE 3

(Example Materials/Thicknesses; FIG. 3 Embodiment)

| Layer | Preferred Range (Å) | More Preferred (Å) | Example (Å) |
|---|---|---|---|
| $Si_3N_4$ (layer 2) | 100-2000 Å | 500-1500 Å | 1000-1300 Å |
| $SiO_x$ (layer 3) | 100-1200 Å | 400-1100 Å | 600-900 Å |
| $TiO_x$ (layer 20) | 100-1100 Å | 250-800 Å | 400-600 Å |
| $SiO_x$ (layer 22) | 100-1200 Å | 400-1100 Å | 600-900 Å |
| NiCr (layer 6) | 80-500 Å | 120-210 Å | 140-190 Å |
| $Si_3N_4$ (layer 7) | 40-500 Å | 60-250 Å | 80-150 Å |
| $TiO_x$ (layer 24) | 50-800 Å | 100-500 Å | 200-400 Å |

In certain example embodiments of this invention, coated articles herein (e.g., see embodiments of FIGS. 1-3) may have the following optical characteristics measured monolithically as shown in Table 4, before or after any optional heat treatment such as thermal tempering. It is noted that subscript "G" stands for glass side reflective, subscript "T" stands for transmissive, and subscript "F" stands for film side reflective. As is known in the art, glass side (G) means when viewed from the glass side (as opposed to the layer/film 11 side) of the coated article. Film side (F) means when viewed from the side of the coated article on which the coating 11 is provided. The characteristics below in Table 4 are in accordance with Illuminant C, 2 degree Observer, and are applicable to HT and non-HT coated articles herein.

TABLE 4

Color/Optical Characteristics (FIGS. 1-3 embodiments)

| | General | Preferred | Most Preferred |
|---|---|---|---|
| $T_{vis}$ (TY): | 5-25% | 7-20% | 7-13% |
| $a^*_T$ | −12 to +12 | −3 to +6 | +1 to +4 |
| $b^*_T$ | −15 to +15 | −6 to +6 | −2 to +2 |
| $R_GY$(glass side): | 55-88% | 63-80% | 67-77% |
| $a^*_G$ | −14 to +12 | −10 to +8 | −7 to +3 |
| $b^*_G$ | −20 to +15 | −5 to +10 | 0 to +5 |
| $R_FY$(film side): | 0.1-9% | 0.3-4% | 0.5-2% |
| $a^*_F$ | −15 to +32 | 0 to +20 | −5 to +16 |
| $b^*_F$ | −55 to +20 | −15 to +5 | −10 to +2 |

Examples 1-3

The following modeled Examples 1-3 are provided for purposes of example only, and are not intended to be limiting. The layer stacks set forth below are on a 6 mm clear glass substrate moving outwardly from the substrate.

TABLE 5

Layer Stack for Example 1

| Layer | Thickness (angstroms) |
|---|---|
| Glass Substrate | 6 mm |
| ZrSiN (layer 2) | 400 Å |
| $SiO_2$ (layer 3) | 700 Å |
| ZnO (layer 4) | 45 Å |
| Ag (layer 5) | 100 Å |
| NiCr (layer 6) | 262 Å |
| ZrSiN (layer 7) | 243 Å |
| $SiO_2$ (layer 8) | 364 Å |
| $ZrO_2$ (layer 9) | 50 Å |

TABLE 6

Layer Stack for Example 2

| Layer | Thickness (angstroms) |
|---|---|
| Glass Substrate | 6 mm |
| ZrSiN (layer 2) | 500 Å |
| $SiO_2$ (layer 3) | 800 Å |
| Al (layer 10) | 30 Å |
| NiCr (layer 6) | 250 Å |
| ZrSiN (layer 7) | 235 Å |
| $SiO_2$ (layer 8) | 350 Å |
| $ZrO_2$ (layer 9) | 70 Å |

TABLE 7

Layer Stack for Example 3

| Layer | Thickness (angstroms) |
|---|---|
| Glass Substrate | 6 mm |
| $Si_3N_4$ (layer 2) | 1165 Å |
| $SiO_2$ (layer 3) | 846 Å |
| $TiO_2$ (layer 20) | 485 Å |
| $SiO_2$ (layer 22) | 857 Å |
| NiCr (layer 6) | 160 Å |
| $Si_3N_4$ (layer 7) | 100 Å |
| $TiO_2$ (layer 24) | 295 Å |

Example 1 relates to the FIG. 1 embodiment, Example 2 relates to the FIG. 2 embodiment, and Example 3 relates to the FIG. 3 embodiment.

Monolithically, before and/or after optional heat treatment such as thermal tempering, Examples 1-3 had the following characteristics.

TABLE 8

Optical Data (Examples 1-3)

| Parameter | Ex. 1 | Ex. 2 | Ex. 3 |
|---|---|---|---|
| $T_{vis}$ (TY)(transmission): | 10.2% | 10.9% | 10.7% |
| $a^*_T$ | 2.5 | 2.9 | −2.7 |
| $b^*_T$ | 0.6 | −0.8 | −1.2 |
| $R_GY$(glass side refl. %): | 72.1% | 69.9% | 76.4% |
| $a^*_G$: | −4.7 | −5.2 | −2.5 |
| $b^*_G$: | 2.1 | 2.4 | 2.0 |
| $R_FY$(film side refl. %): | 0.9% | 1.0% | 2.6% |
| $a^*_F$: | 12.4 | 14.0 | 28.0 |
| $b^*_F$: | −6.4 | −8.5 | −50.9 |

It can be seen for example that the coated article of Example 1 had a visible transmission of 10.2%, which was 61.9% lower than the glass side visible reflectance of 72.1% and 9.3% higher than the film side visible reflectance of 0.9%. Similarly, it can be seen that the coated article of Example 2 had a visible transmission of 10.9%, which was 59% lower than the glass side visible reflectance of 69.9%, and 9.9% higher than the film side visible reflectance of 1.0%. These results from Examples 1-3 provide for good surveillance mirrors as explained herein.

An example embodiment of this invention provides a surveillance window comprising a coated article including a coating supported by a glass substrate, the coating comprising: a first high index dielectric layer having a refractive index of from about 1.8-2.5; a first low index dielectric layer having a refractive index of from about 1.2-1.7 on the glass substrate over at least the first high index dielectric layer; a reflective layer on the glass substrate over at least the first high index dielectric layer and the first low index dielectric layer; a second high index dielectric layer having a refractive index of from about 1.8-2.5 on the glass substrate over at least the reflective layer; wherein the coating is on an observer side of the glass substrate; and wherein the coated article of the surveillance window, measured monolithically, has a visible transmission ($T_{vis}$ or TY) that is lower than a glass side visible reflectance ($R_GY$) of the coated article and higher than a film side visible reflectance ($R_FY$) of the coated article, so that the surveillance window is configured (a) to allow an observer on the observer side to see through the surveillance window to see an object on the opposite side of the surveillance window, and (b) to not allow a viewer on the opposite side to reasonably see through the surveillance window to view things on the observer side.

In the window of the immediately preceding paragraph, the reflective layer may be of or include one or more of: NiCr, Al, NbZr, and Ag.

In the window of any of the preceding two paragraphs, measured monolithically, the coated article of the surveillance window may have a visible transmission that is: at least 40% lower than the glass side visible reflectance ($R_GY$) of the coated article and/or at least 3% higher than the film side visible reflectance ($R_FY$) of the coated article.

In the window of any of the preceding three paragraphs, measured monolithically, the coated article of the surveillance window may have a visible transmission that is: at least 50% lower than the glass side visible reflectance ($R_GY$) of the coated article and/or at least 5% higher than the film side visible reflectance ($R_FY$) of the coated article.

In the window of any of the preceding four paragraphs, measured monolithically, the coated article of the surveillance window may have a visible transmission that is at least 56% lower than the glass side visible reflectance ($R_GY$) of the coated article.

In the window of any of the preceding five paragraphs, measured monolithically, the coated article of the surveillance window may have a visible transmission that is at least 8% higher than the film side visible reflectance ($R_FY$) of the coated article.

In the window of any of the preceding six paragraphs, the first high index dielectric layer and the first low index dielectric layer may directly contact each other.

In the window of any of the preceding seven paragraphs, the coating may further comprise a second low index dielectric layer having a refractive index of from about 1.2-1.7 on the glass substrate over at least the second high index dielectric layer, and the second high index dielectric layer and the second low index dielectric layer may directly contact each other.

In the window of any of the preceding eight paragraphs, the first and/or second low index dielectric layers may comprise silicon oxide.

In the window of any of the preceding nine paragraphs, the first and/or second high index dielectric layers may comprise one or more of zirconium silicon nitride, silicon nitride, and/or titanium oxide (e.g., $TiO_2$).

In the window of any of the preceding ten paragraphs, the coating may further comprise an overcoat comprising zirconium oxide.

In the window of any of the preceding eleven paragraphs, measured monolithically, the coated article of the surveillance window may have a visible transmission of from about 5-25%, more preferably from about 7-20%, and most preferably from about 7-13%.

In the window of any of the preceding twelve paragraphs, measured monolithically, the coated article of the surveillance window may have a film side visible reflectance of from about 0.1-9.0%, more preferably from about 0.3-4.0%, and most preferably from 0.5-2.0%.

In the window of any of the preceding thirteen paragraphs, measured monolithically, the coated article of the surveillance window may have a glass side visible reflectance of from 55-88%, more preferably from 63-80%, and most preferably from about 67-77%.

In the window of any of the preceding fourteen paragraphs, the reflective layer may comprise NiCr, and be located over and directly contacting a metallic or substantially metallic layer comprising Al or Ag.

In the window of any of the preceding fifteen paragraphs, measured monolithically, the coated article of the surveillance window may have a glass side reflective a* value of from −14 to +12, more preferably from −10 to +8, and most preferably from −7 to +3.

In the window of any of the preceding sixteen paragraphs, measured monolithically, the coated article of the surveillance window may have a glass side reflective b* value of from −20 to +15, more preferably from −5 to +10, and most preferably from 0 to +5.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A surveillance window comprising a coated article including a coating supported by a glass substrate, the coating comprising:
    a first high index dielectric layer having a refractive index of from about 1.8-2.5;
    a first low index dielectric layer having a refractive index of from about 1.2-1.7 on the glass substrate over at least the first high index dielectric layer;
    a reflective layer on the glass substrate over at least the first high index dielectric layer and the first low index dielectric layer;
    a second high index dielectric layer having a refractive index of from about 1.8-2.5 on the glass substrate over at least the reflective layer;
    wherein the coating is on an observer side of the glass substrate;
    wherein, measured monolithically, the coated article of the surveillance window has a visible transmission of from about 7-20%;
    wherein the coated article of the surveillance window has a film side visible reflectance of from about 0.1-9.0%;
    wherein, measured monolithically, the coated article of the surveillance window has a glass side visible reflectance of from 63-80%; and
    wherein the coated article of the surveillance window, measured monolithically, has a visible transmission ($T_{vis}$ or TY) that is lower than a glass side visible reflectance ($R_GY$) of the coated article and higher than a film side visible reflectance ($R_FY$) of the coated article, so that the surveillance window is configured (a) to allow an observer on the observer side to see through the surveillance window to see an object on the opposite side of the surveillance window, and (b) to not allow a viewer on the opposite side to reasonably see through the surveillance window to view things on the observer side.

2. The surveillance window of claim 1, wherein the reflective layer comprises one or more of: NiCr, Al, NbZr, and Ag.

3. The surveillance window of claim 1, wherein, measured monolithically, the coated article of the surveillance window has a visible transmission that is at least 40% lower than the glass side visible reflectance ($R_GY$) of the coated article and at least 3% higher than the film side visible reflectance ($R_FY$) of the coated article.

4. The surveillance window of claim 1, wherein, measured monolithically, the coated article of the surveillance window has a visible transmission that is at least 50% lower than the glass side visible reflectance ($R_GY$) of the coated article and at least 5% higher than the film side visible reflectance ($R_FY$) of the coated article.

5. The surveillance window of claim 1, wherein, measured monolithically, the coated article of the surveillance window has a visible transmission that is at least 56% lower than the glass side visible reflectance ($R_GY$) of the coated article.

6. The surveillance window of claim 1, wherein, measured monolithically, the coated article of the surveillance window has a visible transmission that is at least 8% higher than the film side visible reflectance ($R_FY$) of the coated article.

7. The surveillance window of claim 1, wherein the first high index dielectric layer and the first low index dielectric layer directly contact each other.

8. The surveillance window of claim 1, wherein the coating further comprises a second low index dielectric layer having a refractive index of from about 1.2-1.7 on the glass substrate over at least the second high index dielectric layer.

9. The surveillance window of claim 8, wherein the second high index dielectric layer and the second low index dielectric layer directly contact each other.

10. The surveillance window of claim 1, wherein the first and second low index dielectric layers comprise silicon oxide.

11. The surveillance window of claim 1, wherein the first and/or second high index dielectric layers comprise zirconium silicon nitride.

12. The surveillance window of claim 1, wherein the first and/or second high index dielectric layers comprise an oxide of titanium.

13. The surveillance window of claim 1, wherein the coating further comprises an overcoat comprising zirconium oxide.

14. The surveillance window of claim 1, wherein, measured monolithically, the coated article of the surveillance window has a visible transmission of from about 7-13%.

15. The surveillance window of claim 1, wherein, measured monolithically, the coated article of the surveillance window has a film side visible reflectance of from 0.3-4.0%.

16. The surveillance window of claim 1, wherein, measured monolithically, the coated article of the surveillance window has a film side visible reflectance of from 0.5-2.0%.

17. The surveillance window of claim 1, wherein the reflective layer comprises NiCr, and wherein the reflective layer comprising NiCr is located over and directly contacting a metallic or substantially metallic layer comprising Al or Ag.

18. A coated article including a coating supported by a glass substrate, the coating comprising:
    a first dielectric layer;
    a second dielectric layer on the glass substrate over at least the first dielectric layer;
    a reflective layer on the glass substrate over at least the first and second dielectric layers;
    a third dielectric layer on the glass substrate over at least the reflective layer;
    a fourth dielectric layer on the glass substrate over at least the third dielectric layer;
    wherein, measured monolithically, the coated article has a visible transmission of from about 7-20%; and
    wherein the coated article, measured monolithically, has a visible transmission ($T_{vis}$ or TY) that is at least 40% lower than a glass side visible reflectance ($R_GY$) of the coated article and at least 3% higher than a film side visible reflectance ($R_FY$) of the coated article, so that the coated article is configured (a) to allow an observer on an observer side of the coated article to see through the coated article to see an object on an opposite side of the coated article, and (b) to not allow a viewer on the opposite side to reasonably see through the coated article to view things on the observer side.

19. The coated article of claim 18, wherein the reflective layer comprises one or more of: NiCr, Al, and Ag.

20. The coated article of claim 18, wherein, measured monolithically, the coated article has a visible transmission that is at least 50% lower than the glass side visible reflectance ($R_GY$) of the coated article and at least 5% higher than the film side visible reflectance ($R_FY$) of the coated article.

21. The coated article of claim 18, wherein, measured monolithically, the coated article has a visible transmission that is at least 56% lower than the glass side visible reflectance ($R_GY$) of the coated article.

22. The coated article of claim 18, wherein, measured monolithically, the coated article has a visible transmission that is at least 8% higher than the film side visible reflectance ($R_FY$) of the coated article.

23. The coated article of claim 18, wherein the second and fourth dielectric layers comprise silicon oxide.

24. The coated article of claim 18, wherein the first and third dielectric layers comprise zirconium silicon nitride.

25. The coated article of claim 18, wherein the coating further comprises an overcoat comprising zirconium oxide.

26. The coated article of claim 18, wherein, measured monolithically, the coated article has a visible transmission of from about 7-13%.

27. The coated article of claim 18, wherein, measured monolithically, the coated article has a film side visible reflectance of from 0.3-4.0%.

28. The coated article of claim 18, wherein, measured monolithically, the coated article has a film side visible reflectance of from 0.5-2.0%.

29. The coated article of claim 18, wherein the reflective layer comprises NiCr, and wherein the reflective layer comprising NiCr is located over and directly contacting a metallic or substantially metallic layer comprising Al or Ag.

30. A method of making a coated article including a coating supported by a glass substrate, the method comprising:
depositing a first dielectric layer;
depositing a second dielectric layer on the glass substrate over at least the first dielectric layer;
depositing a reflective layer on the glass substrate over at least the first and second dielectric layers;
depositing a third dielectric layer on the glass substrate over at least the reflective layer;
depositing a fourth dielectric layer on the glass substrate over at least the third dielectric layer, so that the coated article, measured monolithically, has a visible transmission ($T_{vis}$ or TY) that is at least 40% lower than a glass side visible reflectance ($R_GY$) of the coated article and at least 3% higher than a film side visible reflectance ($R_FY$) of the coated article, and so that the coated article is configured (a) to allow an observer on an observer side of the coated article to see through the coated article to see an object on an opposite side of the coated article, and (b) to not allow a viewer on the opposite side to reasonably see through the coated article to view things on the observer side;
wherein, measured monolithically, the coated article has a visible transmission of from about 7-20%;
wherein the coated article has a film side visible reflectance of from about 0.1-9.0%; and
wherein, measured monolithically, the coated article has a glass side visible reflectance of from 63-80%.

\* \* \* \* \*